United States Patent [19]

Rinker et al.

[11] Patent Number: 5,627,420
[45] Date of Patent: May 6, 1997

[54] PUMP POWERED BY A CANNED ELECTRIC MOTOR HAVING A REMOVABLE STATOR CARTRIDGE

[75] Inventors: Eric D. Rinker, Penn Township; William J. Elzer; James C. Hahn, both of Plum Borough; Linda O. Backo, Baldwin Borough, all of Pa.

[73] Assignee: Westinghouse Electric Corporation, Pittsburgh, Pa.

[21] Appl. No.: 357,004

[22] Filed: Dec. 16, 1994

[51] Int. Cl.$^6$ .................................... H02K 7/06
[52] U.S. Cl. .................. 310/87; 310/42; 310/54
[58] Field of Search .................. 310/42, 54, 62, 310/87, 61, 59, 58, 63, 60 A, 89

[56] References Cited

U.S. PATENT DOCUMENTS

| | | | |
|---|---|---|---|
| 3,047,753 | 7/1962 | Westell | 310/91 |
| 3,067,690 | 12/1962 | Kramer et al. | 310/63 |
| 3,638,055 | 1/1972 | Zimmerman | 310/43 |
| 3,742,595 | 7/1973 | Lykes | 29/596 |
| 3,842,298 | 10/1974 | Schaefer | 310/87 |
| 4,104,551 | 8/1978 | Blank et al. | 310/88 |
| 4,283,645 | 8/1981 | Hofmann | 310/87 |
| 4,492,889 | 1/1985 | Fukushi et al. | 310/87 |
| 4,532,446 | 7/1985 | Yamamoto et al. | 310/87 |
| 4,564,780 | 1/1986 | Nel | 310/258 |
| 4,616,980 | 10/1986 | Carpenter | 417/357 |
| 4,716,648 | 1/1988 | Nel | 29/596 |
| 5,034,644 | 7/1991 | Kech | 310/254 |
| 5,117,138 | 5/1992 | Trian | 310/89 |
| 5,129,795 | 7/1992 | Hyland | 417/423.12 |
| 5,248,245 | 9/1993 | Behnke et al. | 417/366 |
| 5,331,238 | 7/1994 | Johnsen | 310/58 |
| 5,494,403 | 2/1996 | Kobayashi et al. | 415/182.1 |

*Primary Examiner*—Steven L. Stephan
*Assistant Examiner*—Jonathan Link
*Attorney, Agent, or Firm*—J. C. Spadacene

[57] ABSTRACT

A pump powered by a canned motor has a removable stator cartridge. One end of a generally hollow pressure housing is secured to a pump housing. An annular stator cartridge is removably secured in the pressure housing. An annular gap between the inner surface of the pressure housing and the outer surface of the stator cartridge defines a flow path for cooling fluid to permit the stator cartridge to be surrounded by cooling fluid. A rotor is operatively positioned inside the stator cartridge to form an electric motor when the stator cartridge is energized. The output shaft of the rotor is connected to an impeller in the pump housing. The rotor is rotatably supported by bearings. An end cap is removably secured to the other end of the pressure housing. Removal of the end cap permits access to and removal of the stator cartridge without requiting removal of the motor from the pump housing.

13 Claims, 4 Drawing Sheets

5,627,420

PUMP POWERED BY A CANNED ELECTRIC MOTOR HAVING A REMOVABLE STATOR CARTRIDGE

BACKGROUND OF THE INVENTION

1. Field of the Invention

This invention relates to a fluid pump powered by a canned electric motor, and more particularly, to a canned electric motor having a removable stator cartridge.

2. Background Information

Pumps powered by canned electric motors are used in a variety of applications. For example, such pumps may be used to circulate cooling water through nuclear reactors. Pumps used in those types of applications are typically large and are powered by large motors. Often, the pump motors are positioned in confined spaces where ventilation for air cooling is poor. In such instances, adequate liquid cooling of the motor is necessary to reduce the build up of excess heat in the confined area. Circulation of cooling fluid around the stator, including between the stator and the pressure housing of the motor, is desirable for adequate cooling. With prior art canned motors, the stator is integral with the pressure housing. Thus, cooling fluid cannot circulate between the housing and the stator.

In addition, with motors of that configuration, the stator is not removable from the remainder of the motor without also removing the pressure housing. Thus, if the stator fails, it is often expedient to simply replace the entire motor rather than trying to replace the stator/pressure housing when the motor is in place. That approach requires that replacement motors be kept available in the event that maintenance is required.

Furthermore, when it is desirable to clean the stator, such as when the motor is operated in hazardous or corrosive conditions, that task is extremely difficult with prior art canned pump motors. Again, the entire pressure housing and stator cartridge must be removed, which typically requires removal and disassembly of the entire motor.

There is a need for a canned pump motor that has a stator that is separate and removable from the remainder of the motor and pump without requiring removal of the entire motor from the pump. There also remains a need for a canned pump motor that enables cooling fluid to be circulated between the shator and the pressure housing of the motor.

SUMMARY OF THE INVENTION

This invention provides a pump powered by a canned motor having a removable stator cartridge. The pump includes a hollow pressure housing. An end cap is removably attached to one end of the pressure housing and is positioned so that it is in communication with the hollow portion of the pressure housing to form an enclosure. The hollow portion of the pressure housing is also in communication with the hollow portion of the pump housing. The pump housing includes an inlet port, and a discharge port. An annular, hermetically sealed stator cartridge is removably positioned in the hollow portion of the pressure housing. The stator cartridge is removably secured to the pressure housing so that an annular gap is formed between an inner surface of the pressure housing and an outer surface of the stator cartridge. Each end of the gap is in communication with the hollow portion of the pressure housing to define a flow path between the hollow portion of the pressure housing adjacent to the end cap to the hollow portion of the pressure housing adjacent to the pump housing. Energizing means, such as connection to an external source of electrical power, are provided for supplying electrical energy to the stator cartridge.

An annular, hermetically sealed rotor is operatively positioned inside the stator cartridge to form an electrical motor. The rotor is positioned such that the electrical energization of the stator will produce rotation of the rotor. Bearings rotatably support the rotor. The rotor is mounted on an output shaft for coaxial rotation therewith. An impeller mounted on the output shaft is structured to create fluid flow from the inlet port to the discharge port of the pump housing.

The end cap is in communication with a cooling fluid supply. The flow of cooling fluid flows through the annular gap between the pressure housing and the stator cartridge to cool the stator. The cooling fluid may also be circulated around the rotor and across the beatings to cool those components. Cooling fluid is introduced into the enclosure through the end cap for circulation through the flow path. Alternately, cooling of the rotor and beatings may be provided by the circulation thereacross of the fluid that is being pumped by the impeller. At least a portion of the annular gap is of sufficient size so as to permit laminar flow of the cooling fluid therethrough.

A stator cartridge for a canned motor is also provided. The stator cartridge is structured to be removably received into a pressure housing and operatively positioned around a rotor to form an electric motor. The stator cartridge includes a generally cylindrical frame. The forward end of the frame is structured to form a friction fit with the pressure housing. The aft end of the frame preferably has a flange thereon for connecting the cartridge to the pressure housing. Electrical windings on the frame are positioned to generate a rotating electromagnetic field within the hollow portion of the frame to induce an electric current in the rotor. Energizing means, such as connections to an external electrical power supply, are connected to the windings to supply electrical current thereto. The forward end of the frame has at least one axially extending passage therethrough. The flange has at least one axially extending flow port therethrough. A stator cartridge can is secured to the frame to hermetically seal the windings therein. The stator can is positioned such that the passages and flow ports are outside of the can.

It is an object of this invention to provide a pump powered by a canned electric motor having a stator cartridge that is readily removable for maintenance and replacement and in which the removal or replacement thereof does not require removal or replacement of the entire motor.

It is a further object of this invention to provide a removable stator cartridge for a canned electric motor which can be readily removed from the motor without requiring the disassembly of the motor housing from the pump housing.

It is another object of this invention to provide a canned electric pump motor and a removable stator cartridge therefor that provides for the flow of cooling fluid between the stator cartridge and the pump housing.

These and other objects of this invention will be more fully understood from the following description of the preferred embodiment of the invention with reference to the attached drawings.

DETAILED DESCRIPTION OF THE PREFERRED EMBODIMENT

Figure 1:
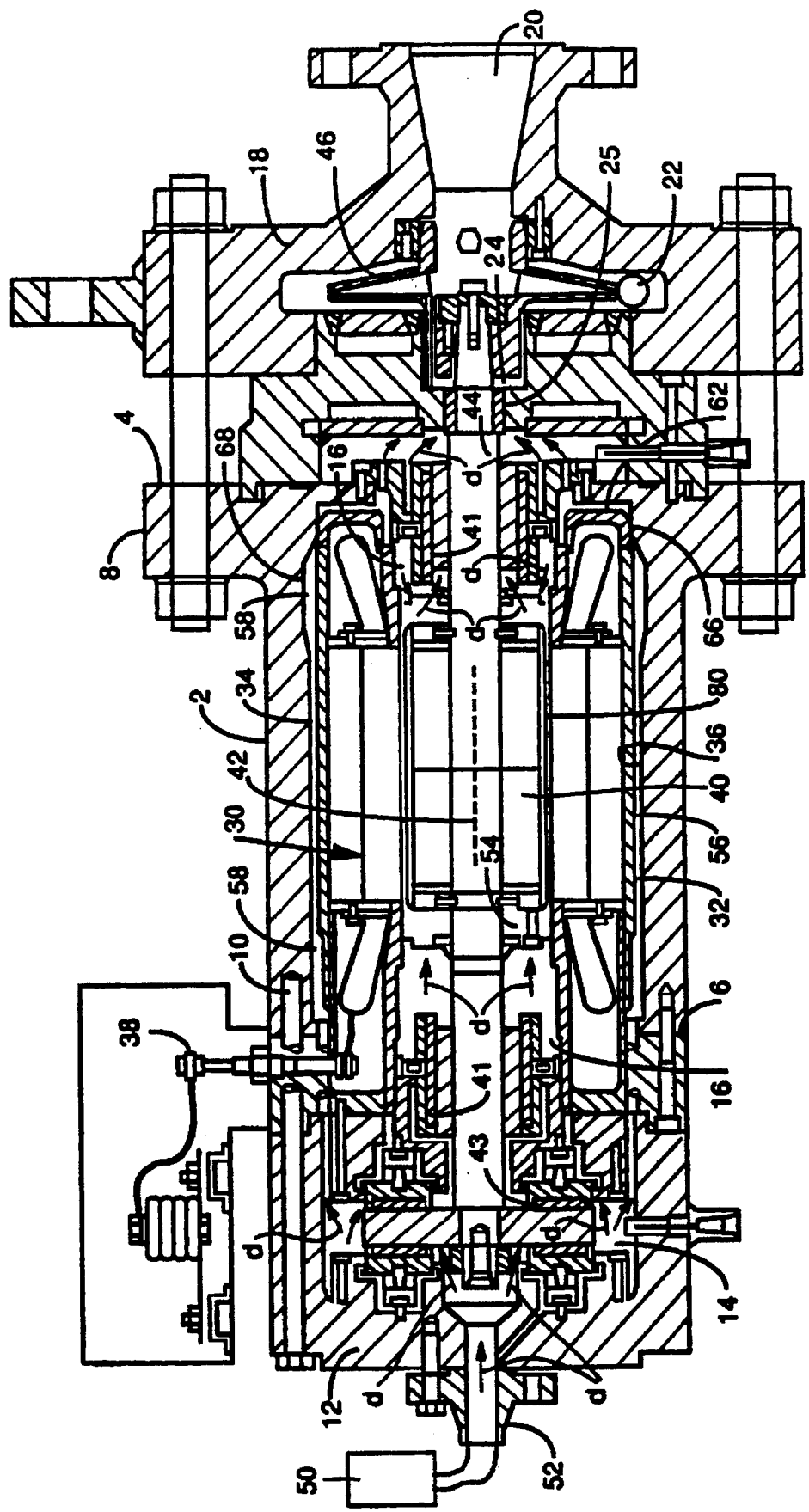
FIG. 1 is a longitudinal sectional view of the pump and canned pump motor of this invention.

Referring to FIG. 1, there is shown a pump powered by a canned motor. The pump includes a generally hollow pressure housing 2. Pressure housing 2 includes a forward end 4 and an aft end 6. Forward end 4 has a flange 8 thereon. Aft end 6 has openings 10 therein for receiving bolts for attachment of other structures thereto.

A generally hollow end cap is removably attached to aft end 6 of pressure housing 2. End cap 12 is positioned such that the hollow portion 14 thereof is in communication with the hollow portion 16 of pressure housing 2.

A generally hollow pump housing 18 is secured to forward end 4 of pressure housing 2. Bolts, or other suitable fasteners, extending through flange 8 and into pump housing 18 removably secure pump housing 18 to pressure housing 2. Pump housing 18 has an inlet port 20 and a discharge port 22. The hollow portion 24 of pump housing 18 is in communication with the hollow portion 16 of pressure housing 2 through labyrinth seal interface 25.

A generally annular, hermetically sealed stator cartridge 30 is removably positioned in hollow portion 16 of pressure housing 2. Stator cartridge 30 is removably secured to pressure housing 2 in a manner that will be more fully described as follows. Stator cartridge 30 is positioned such that a generally annular gap 32 is formed between the outer surface 34 of stator cartridge 30 and the inner surface 36 of pressure housing 2. Annular gap 32 is in communication with hollow portion 14 of end cap 12 and hollow portion 16 of pressure housing 2 and defines a flow path therebetween. Energizing means 38 are provided for supplying electrical energy to stator cartridge 30. Energizing means may be any conventional manner of connecting stator cartridge 30 to an external source of electrical energy.

A generally annular, hermetically sealed rotor 40 is operatively positioned inside stator cartridge 30 to form a canned electric motor. Electrical energization of stator cartridge will create electromagnetic fields which will cause rotor 40 to rotate about its longitudinal axis 42. Rotor 40 is mounted on output shaft 44 for coaxial rotation therewith. Output shaft 44 extends into hollow portion 24 of pump housing 18. Bearings rotatably support rotor 40. In a preferred embodiment, two sets of fluid cooled radial bearings 41 and one set of thrust bearing 43 are provided.

Impeller 46 is mounted on output shaft 44 for rotation therewith. Rotation of rotor 40 and output shaft 44 rotates impeller 46, which thereby creates a flow of fluid from inlet port 20 to discharge port 22. Impeller 46 and pump housing 18 combine to form a centrifugal pump that is powered by the canned motor. Impeller preferably generates a pressure of about 400 to 500 ft of head above system pressure in the pumped fluid. It will be appreciated, however, that this invention may be used with pumps of sizes designed to generate virtually any pressure.

Hollow portion 14 of end cap 6 is preferably in communication with cooling fluid supply 50. Cooling fluid supply is preferably separate for the pumped fluid. It will be appreciated, however, that the pumped fluid could be used as cooling fluid. In a preferred embodiment, the cooling fluid is introduced into hollow portion 14 of end cap 12 through injection port 52. The cooling fluid is introduced at a pressure that is higher than the pressure produced by the pump. For example, when the system pressure of the pumped fluid is about 2,000 psi, the pressure of the cooling fluid would be greater than 2,000 psi. The resulting pressure differential permits the cooling fluid to flow from injection port 52 toward hollow portion 24 of pump housing 18, where it is discharged through discharge port 22 along with the pumped fluid. In a preferred embodiment, the cooling fluid flows from injection port 52 into hollow portion 14 of end cap 12, across water cooled thrust beatings 43 and one set of radial beatings 41, into the space 54 surrounding rotor 40, across the second set of radial bearings 41 and into hollow portion 24 of pump housing 18. The cooling fluid that travels that path provides cooling and lubrication for bearings 41 and 43 and cooling for rotor 40 and stator cartridge 30. That cooling fluid is also the medium in which rotor 40 rotates. The cooling fluid also flows from injection port 52, into hollow portion 14 of end cap 12, through annular gap 32 between stator cartridge 30 and pressure housing 2 and into hollow portion 24 of pump housing 18. The cooling fluid traveling that path provides cooling for stator cartridge 30. The direction of flow of the cooling fluid through the motor and pump is indicated generally by arrows d. It will be appreciated that the cooling fluid surrounds stator cartridge 30 to provide more even and thorough heat removal.

In a preferred embodiment, annular gap 32 includes a central portion 56 and an end portion 58 at each end thereof. Central portion 56 is of a size to permit substantially laminar flow of the coolant fluid therethrough. Central portion 56 of annular gap 32 is preferably about 0.100 to 0.120 inches wide and extends about 10 to 11 inches along the length of stator cartridge 30. End potions 58 of annular gap 32 are radially larger than central portion 56. End portions 58 are mixing chambers where the cooling fluid undergoes turbulent flow thereby providing more uniform temperature distribution throughout the fluid. In a preferred embodiment, the end portion 58 on the forward end of annular gap 32 is formed by increasing the interior diameter of hollow portion 16 of pressure housing 2 in the area of that end portion. The end portion 58 on the aft end of annular gap 32 is formed by reducing the exterior diameter of annular stator 0.200 inches. Each of end portions 58 are preferably about 0.225 to 0.250 inches wide and extend about 0.30 to 0.40 inches along the length of stator cartridge 30.

Figure 2:
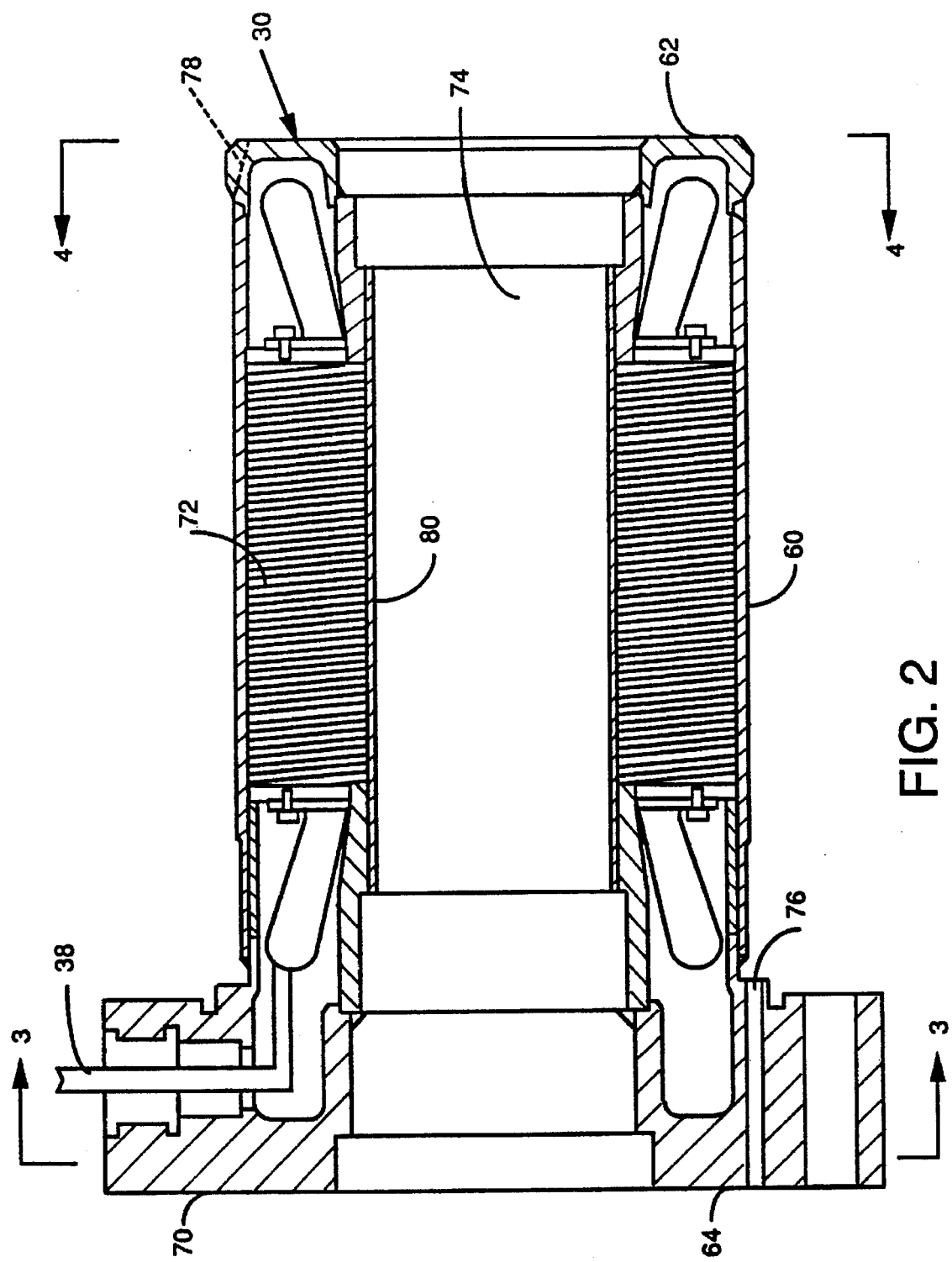
FIG. 2 is a longitudinal sectional view of the stator cartridge of this invention.
Figure 3:
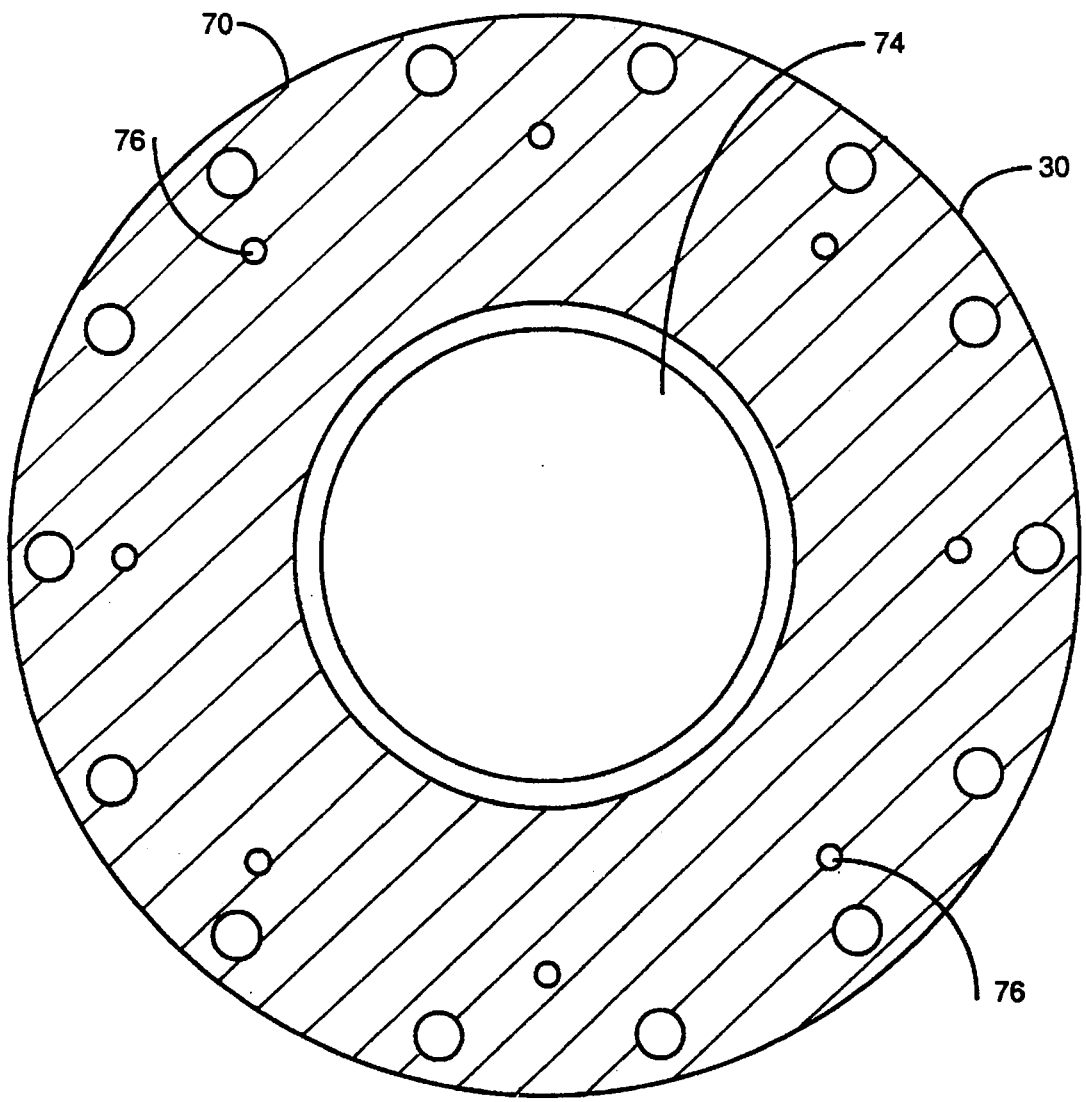
FIG. 3 is cross-sectional view of the stator cartridge of this invention taken along line 3—3 of FIG. 2.
Figure 4:
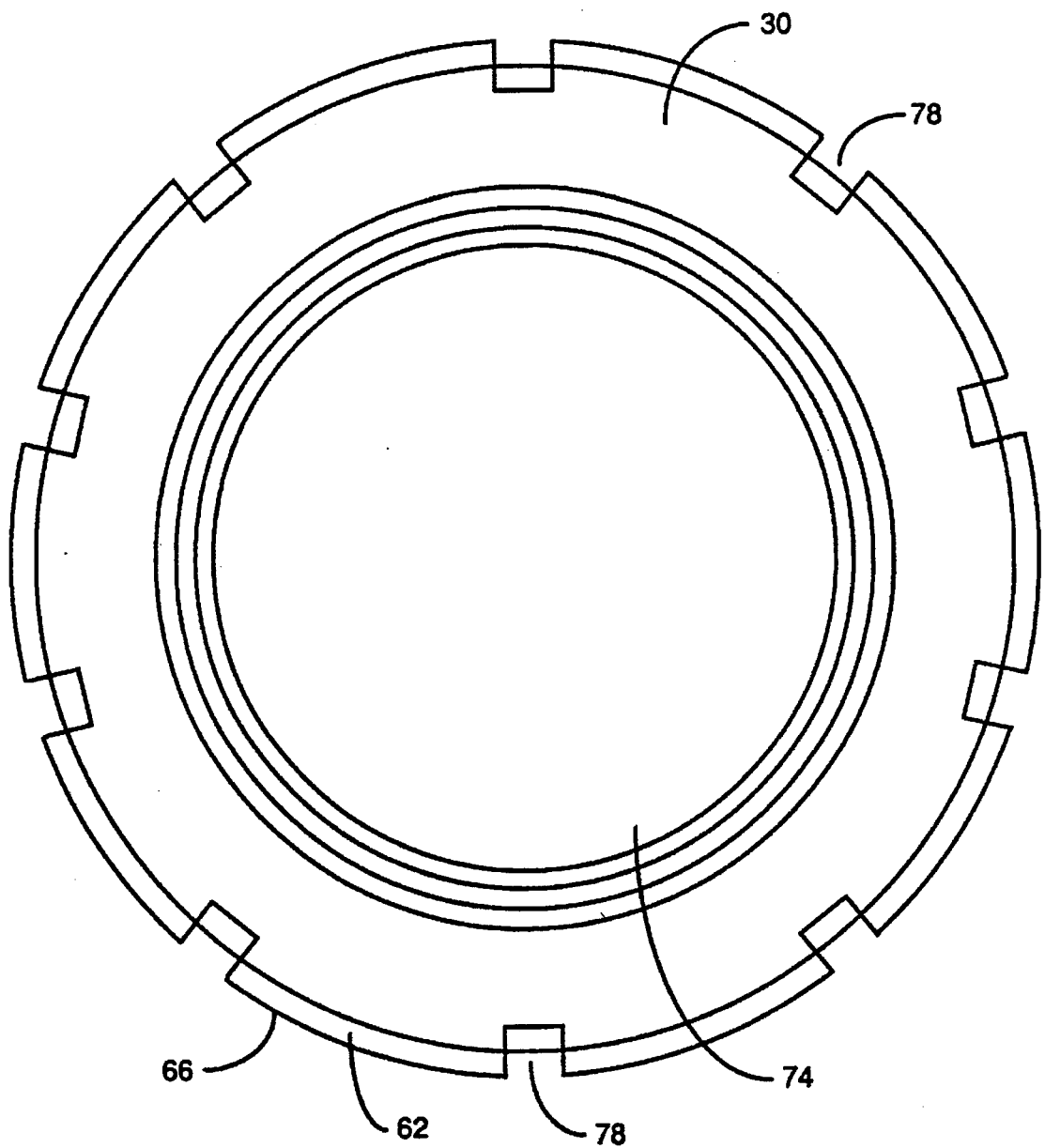
FIG. 4 is a cross-sectional view of the stator cartridge of this invention taken along line 4—4 of FIG. 2.

Referring now to FIGS. 2–4, there is shown, in greater detail, the annular stator cartridge 30 of this invention. Stator cartridge 30 includes a generally cylindrical frame 60 having a forward end 62 and an aft end 64. Forward end 62 is structured to be friction fitted into hollow portion 16 of pressure housing 2. In a preferred embodiment, an enlarged diameter portion 66 of frame 60 is frictionally received into a reduced diameter portion 68 (FIG. 1) of hollow portion 16 of pressure housing 2. Aft end 64 of frame 60 includes flange 70 for connecting stator cartridge 30 to pressure housing 2 and to end cap 12 (FIG. 1). Flange 70 is preferably removably secured to attachment means 10 of aft end 6 of pressure housing 2 using bolts or other suitable fasteners, as is shown more clearly in FIGS. 1 and 4.

Electrical windings in stator laminations 72 are positioned to generate a rotating electromagnetic field within the hollow portion 74 of frame 60. The electromagnetic field induces a current in the rotor surrounded by laminations 72 when stator cartridge 30 is in operating position. Energy means 38 supply electrical energy to laminations 72.

An array of generally axially extending flow port 76 extends through flange 70. When stator cartridge 30 is in position in pressure housing 2, one end of each flow port 76 is in communication with hollow portion 14 of end cap 12. The other end of each flow port 76 is in communication with annular gap 32. Flow ports 76 form a portion of the flow path between the hollow portion 14 of end cap 12 and hollow portion 16 of pressure housing 2 and through annular gap 32. In a preferred embodiment, about 8 to 32 flow ports 76 spaced around the diameter of flange 70 are provided, as shown more clearly in FIG. 3. Flow ports 76 are preferably cylindrical and each has a diameter of 0.425 to 0.450 inches. It will be appreciated that flow ports 76 may be of any suitable size, and configuration and number, depending upon cooling fluid flow rate and pressure considerations.

Referring more particularly to FIG. 4, at least one axially extending passage 78 extends through forward end 62 of stator cartridge frame 60. When stator cartridge 30 is in position in pressure housing 2, as shown in FIG. 1, one end of each passage 78 is in communication with annular gap 32 and the other end of each passage 78 is in communication with hollow portion 16 of pressure housing 2. Passages 78 define a portion of the flow path between hollow portion 14 of end cap 12 and hollow portion 16 of pressure housing 2 and through annular gap 32. As shown in FIG. 4, forward end 62 of frame 60 has a crenulated configuration thereby providing a plurality of passages 78. In a preferred embodiment, a symmetrical pattern of 10 to 20 passages 78 are provided. Passages 78 are sized to match the hydraulic resistance path existing in annular gap 32.

Referring to FIGS. 1 and 2, stator cartridge 30 is hermetically sealed by stator can 80. Stator can 80 seals laminations 72 within stator cartridge frame 60 and is preferably shrink fitted around stator cartridge frame 60. Stator can 80 is positioned so that passages 78, flow ports 76 and annular gap 32 are outside of the stator can 80.

Referring again to FIG. 1, stator cartridge 30 may be removed from pressure housing 2 by removing end cap 12 and the bearing assembly therein. The bolts holding flange 70 of stator cartridge 30 to pressure housing 2 are removed and stator cartridge 30 may be removed from aft end 6 of pressure housing 2 without the need to remove the entire pressure housing and rotor from the pump housing. The stator cartridge may then be repaired or replaced with a new unit as required. The ability to remove and replace the stator cartridge without removing the entire motor substantially reduces maintenance down time and associated costs. That is of particular importance in radioactive environments. A reduction in repair time will result in the worker repairing the motor being exposed to less radiation.

With prior art canned pump motors, when a stator failed, the expedient maintenance solution to reduce down time is typically to replace the entire motor. Replacement of the failed stator also requires replacement of the entire pressure housing and complex disassembly procedures which are difficult to accomplish while the motor is in place. That approach also required keeping an entire spare motor on hand in the event that replacement is necessary. It will be appreciated that with this invention, a failed stator cartridge may be easily replaced, typically in the same time or less time than is required to replace the entire motor. In addition, spare parts costs are substantially reduced since it is no longer necessary to keep an entire motor on hand for anticipated stator failures. Instead, only a replacement stator cartridge is needed.

Whereas particular embodiments of this invention have been described for purposes of illustration, it will be evident to those skilled in the art that numerous variations in detail may be made without departing from the invention as described in the appended claims.

What is claimed is:

1. A pump powered by a canned motor comprising:

a generally hollow pressure housing having a forward end and an aft end and a hollow portion;

an end cap removably attached to said aft end of said pressure housing and in communication with the hollow portion of said pressure housing;

a generally hollow pump housing secured to said forward end of said pressure housing, said pump housing having an inlet port and a discharge port and a hollow portion, with the hollow portion of said pump housing being in communication with the hollow portion of said pressure housing;

a generally annular, hermetically sealed stator cartridge removably positioned in the hollow portion of said pressure housing and removably secured to said pressure housing so that a generally annular gap is formed between an inner surface of said pressure housing and an outer surface of said stator cartridge, said annular gap being in communication with the hollow portion of said pump housing adjacent to said aft end of said pressure housing and said hollow portion of said pressure housing adjacent to said forward end of said pressure housing, said annular gap defining a flow path from said ends of said pressure housing;

energizing means for supplying electrical energy to said stator cartridge;

a generally annular, hermetically sealed rotor operatively positioned inside said annular stator cartridge so that electrical energization of said stator will cause rotation of said rotor, said rotor having an output shaft mounted for rotation therewith and extending into said hollow portion of pump housing;

an impeller mounted on said output shaft of said rotor for rotation therewith to create a flow of fluid from said inlet port to said outlet port of said pump housing; and bearing means for rotatably supporting said rotor.

2. The pump of claim 1, wherein
said end cap is in communication with a cooling fluid supply to introduce cooling fluid into said flow path.

3. The pump of claim 1, wherein
said end cap has a hollow portion in communication with said hollow portion of said pressure housing; and
said stator cartridge further has at least one axially extending flow port in communication with said annular gap and the hollow portion of said end cap and at least one axially extending passage in communication with said annular gap and said hollow portion of said pressure housing, said flow port, said annular gap and said passage defining said flow path.

4. The pump of claim 3, wherein
said stator cartridge has a forward end, said forward end of said stator cartridge is crenulated forming a plurality of said passages and structured to form a friction fit into a portion of said pressure housing to support said cartridge in said hollow portion of said pressure housing.

5. The pump of claim 4, wherein
said stator cartridge has an aft end, said aft end of said stator cartridge having cartridge flange means thereon for removable connection to said pressure housing.

6. The pump of claim 5, wherein
a portion of said annular gap at at least one end thereof is radially larger than said annular gap is at its center, each said larger portion providing a mixing chamber for the cooling fluid flowing therein.

7. The pump of claim 6, wherein
the center portion of said annular gap is of a size to permit substantially laminar flow in the cooling fluid flowing therethrough.

8. The pump of claim 7, wherein
said bearing means are fluid cooled bearings and are positioned in communication with said cooling fluid within the hollow portion of at least one of said pressure housing and said end cap.

9. The pump of claim 8, wherein
the cooling fluid is introduced into said hollow portion of said end cap at a pressure that is higher than the pressure produced by rotation of said impeller to produce a flow of cooling fluid from said hollow portion of said end cap through said flow path to said hollow part of said pump housing.

10. The pump of claim 9, wherein
said stator is hermetically sealed by a stator cartridge can that is shrink fitted around said stator, with said passage and said flow port being outside said stator can.

11. The pump of claim 10, wherein
said forward end of said pressure housing has flange means thereon for connection to said pump housing; and
said aft end of said pressure housing has attachment means thereon for connection to said end cap and said stator cartridge.

12. A stator cartridge for a canned motor, said stator cartridge being structured to be removably received into a pressure housing and operatively positioned around a rotor to form an electric motor, said stator cartridge comprising:

a generally cylindrical frame having a forward end crenulated to form a plurality of passages and an aft end, said forward end being structured to form a friction fit with said pressure housing, said aft end having connection means thereon for removably connecting said stator cartridge to the pressure housing and at least one of said aft end and said forward end having a smaller outside diameter than a central portion of said frame, the smaller outside diameter portion forming a mixer chamber when said stator cartridge is received into said pressure housing;

electrical windings on said frame, said windings positioned to generate a rotating electromagnetic field within the hollow portion of said frame and induce an electrical current in the rotor;

energizing means connected to said windings to supply electrical current thereto;

at least one generally axially extending flow port extending through said connection means;

at least one generally axially extending passage in said forward end of said frame; and a stator cartridge can secured to said frame to hermetically seal said windings therewithin, and positioned so that said passage and said flow port are outside of said stator can.

13. The stator cartridge of claim 12, wherein
said stator can is shrink fitted onto said frame.

* * * * *